Jan. 15, 1957 G. BECK 2,777,408
MACHINE FOR ATTACHING TAGS TO TEA BAGS AND THE LIKE
Filed Aug. 21, 1953 4 Sheets-Sheet 1
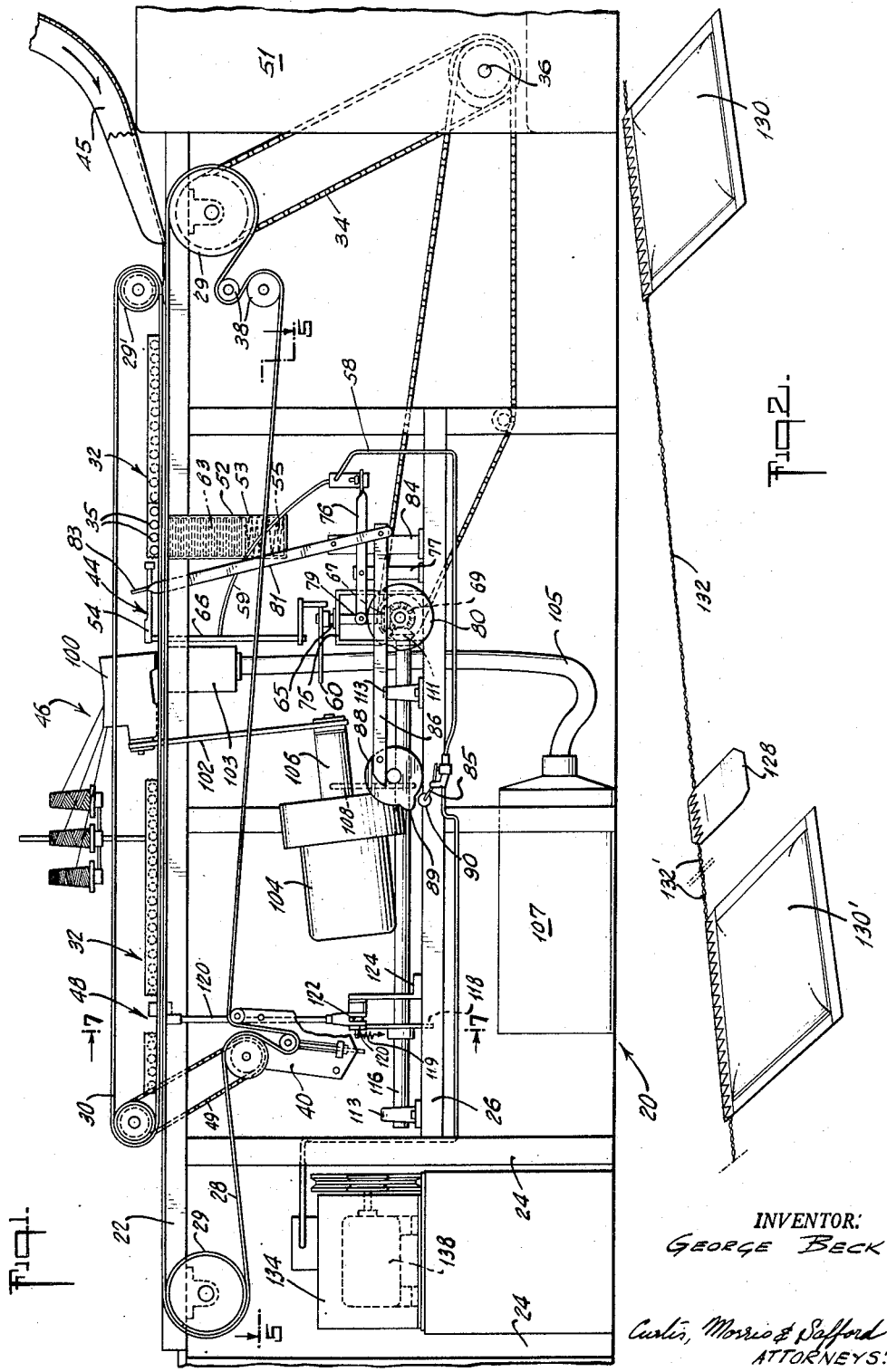
INVENTOR:
GEORGE BECK
Curtis, Morris & Safford
ATTORNEYS Jan. 15, 1957  G. BECK  2,777,408
MACHINE FOR ATTACHING TAGS TO TEA BAGS AND THE LIKE
Filed Aug. 21, 1953  4 Sheets-Sheet 2
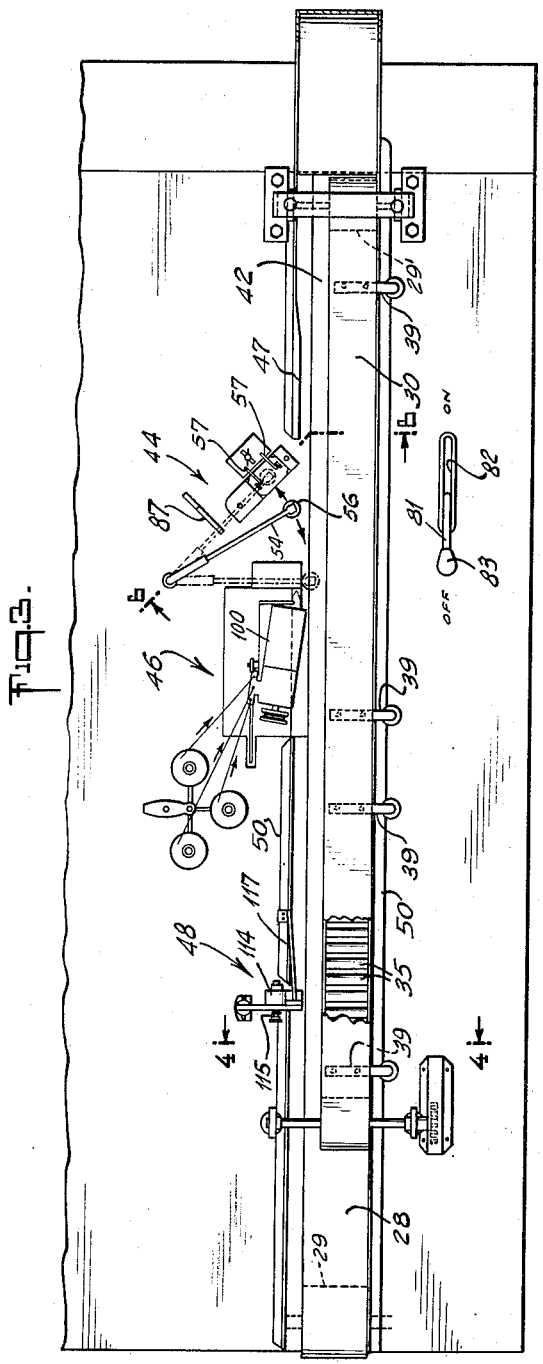
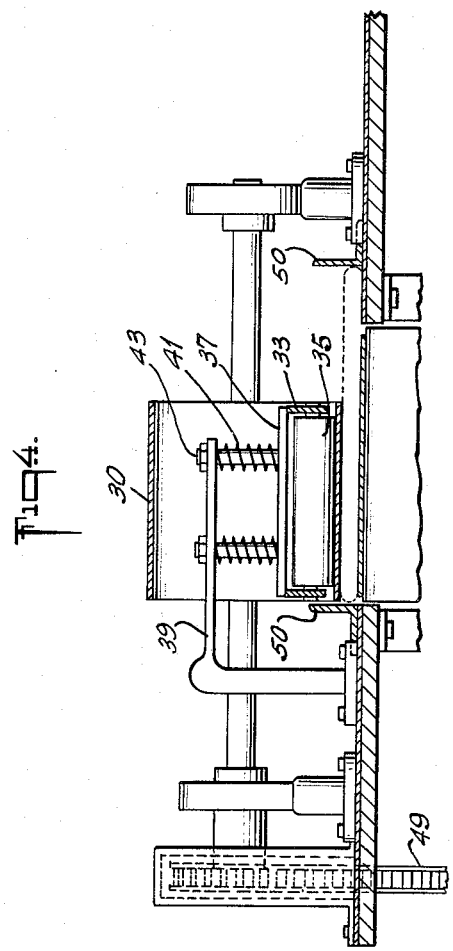
INVENTOR.
GEORGE BECK
BY
Curtis, Morris & Safford
ATTORNEYS:

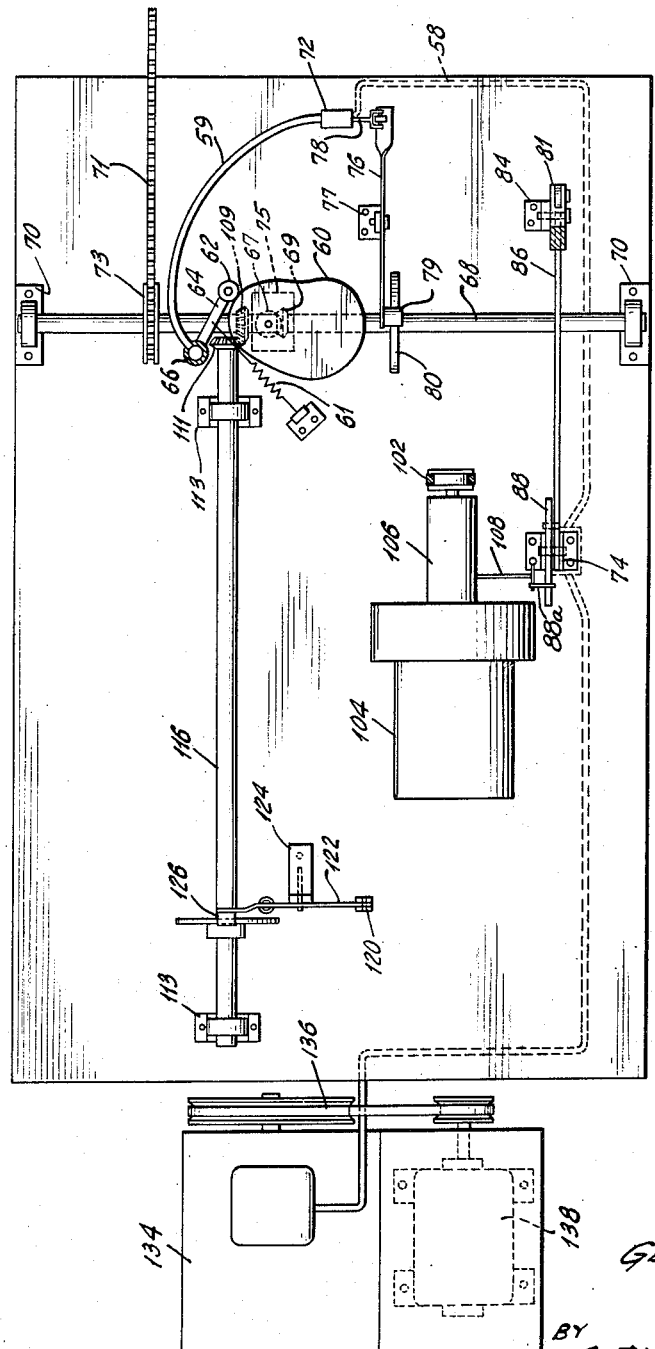

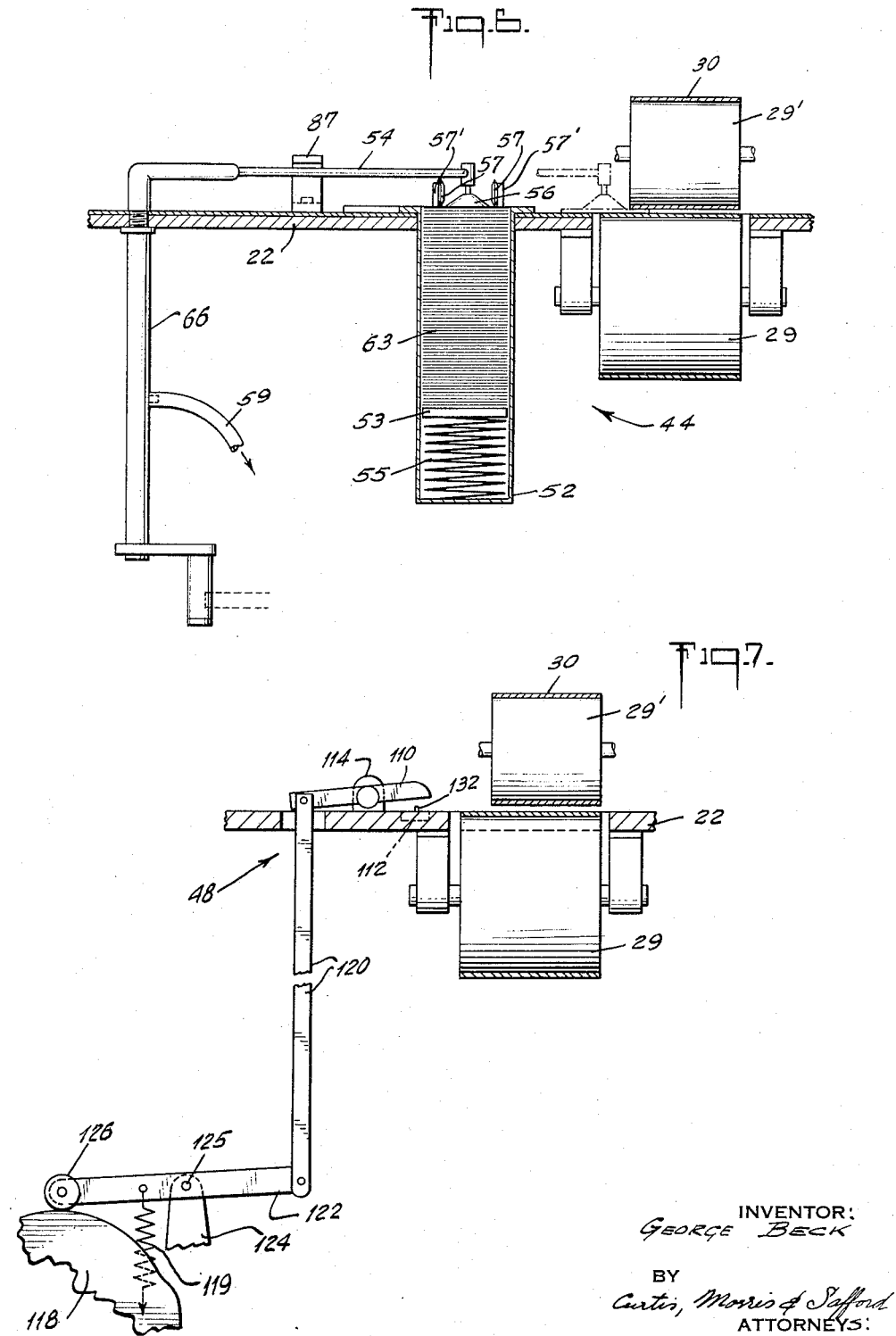

United States Patent Office 2,777,408
Patented Jan. 15, 1957

2,777,408

MACHINE FOR ATTACHING TAGS TO TEA BAGS AND THE LIKE

George Beck, La Marque, Tex., assignor to Thomas J. Lipton Co., Inc., Hoboken, N. J., a corporation of New Jersey Application August 21, 1953, Serial No. 375,598

6 Claims. (Cl. 112—2)

This invention relates to a machine for automatically attaching tags to tea bags, and more particularly to a machine for attaching a tag and supporting string along one edge of a large size tea bag to permit handling and suspension of the bag in a brewing medium.

Tea bags of the present invention are used in making large quantities of iced tea, particularly for use in restaurants, institutions, etc. For such use it is desirable to use two or more ounces of tea in a gallon or more of hot water, and tea bags containing such quantities of tea have utility.

According to the present invention a large size paper-type tea bag is provided that may be easily inserted and suspended in the hot water for brewing and then withdrawn from the brewing medium without rupture of the bag. It is an object of the present invention to provide a machine which automatically: reinforces one edge of a large size tea bag; attaches a length of string to said reinforced edge; and, attaches a tag to the end of said string a suitable distance away from said bag to permit suspension thereof in the hot water. It is another object of the present invention to provide a machine for automatically moving the completed bags at spaced intervals past a tag supply, a sewing machine and a cutting device, all synchronized in operational sequence to attach the tag to an end of a desired length of string which is fixed to one edge of the bag. It is another object of the present invention to provide a mechanism for transporting groups of one or more filled bags along an operating path and inserting a handle forming tag between the groups of bags as they move along said path, joining said groups of bags and tags together by a continuous thread and severing said bags and tags at the appropriate intervals. It is another object of the present invention to provide a machine for automatically applying a handle forming tag to a large size bag in such a manner as to permit suspension thereof in a hot brewing medium without rupture of the bag. These and other and further objects will be in part apparent and in part pointed out as the specification proceeds.

In the drawings:

Figure 1 is a side elevation partially broken away of a machine according to the present invention;

Figure 2 is a perspective view of a bag joined to its tag according to the present invention and showing a portion of the preceding bag still attached thereto;

Figure 3 is a top plan view of the machine of Figure 1;

Figure 4 is a partial sectional view taken on line 4—4 of Figure 3, and showing the suspension of the roller assemblies;

Figure 5 is a top plan view on line 5—5 of Figure 1 with certain parts removed for clarity;

Figure 6 is a sectional view on line 6—6 of Figure 3 showing the details of the tag supply mechanism; and Figure 7 is a sectional view on line 7—7 of Figure 1 showing the details of the trimmer mechanism.

Referring now to Figure 1, a machine 20 includes a frame formed by a table 22 supported on a series of legs 24 and a shelf 26 mounted thereon approximately midway between the table top and the floor. Mounted below and above the table top respectively are lower and upper endless conveyor belts 28 and 30 which have adjacent runs which cooperate to form therebetween a bag-carrying unit for moving the tea bags along the operation zone at the table top past the various operating devices. Lower belt 28 is supported about a pair of rollers 29 and upper belt 30 is similarly supported by rollers 29' but is resiliently urged downwardly with its lower run in contact with the upper run of the lower belt.

This mounting of belt 30 is by two roller assemblies 32 (see Figure 4) which are mounted in frames 33 hung from brackets 39 on the table. Roller assemblies 32 comprise longitudinal frame members 33 in which are journalled a plurality of rollers 35. The frames 33 have at spaced intervals therealong transverse straps 37 two of which are hung on brackets 39 to support the roller assemblies relative to the table top. The roller assemblies 32 are resiliently urged downwardly toward the upper run of the lower belt by springs 41 positioned between brackets 39 and straps 37 about bolts 43 which are fixed to straps 37 and loosely carried in brackets 39. Thus the bags are firmly gripped between the endless belts as they pass therebetween but sufficient resiliency is provided to compensate for the different thicknesses of tea so that the tea will not be crushed and spoiled. Belt 30 is driven from belt 28 by chain 49 which in turn is driven through a chain 34 by an electric motor or other driving means. Advantageously, chain 34 is driven from a shaft 36 geared to the main drive of the associated bag forming machine 51. Below the surface of the table top at the right hand end of Figure 1 there is a pair of idler rollers 38 and at the left hand end a tension-adjusting assembly 40 which provides for adjustment and control of the belt tension.

As best shown in Figure 3, the upper conveyor belt is narrower than the lower conveyor belt 28, and the belts are aligned along one edge leaving an exposed portion 42 of the upper run of belt 28 along the other edge. Belt 30 is also shorter so as to expose the end of belt 28. Mounted on table 22 adjacent the exposed edge 42 are a tag applying mechanism 44; a sewing machine mechanism 46; and, a trimmer or cutting mechanism 48.

In operation, the bags to be processed are formed with a reinforced edge, for instance as described in the copending application of Arthur J. Bennett, Serial No. 330,318 filed January 8, 1953, and then dropped down chute 45 where they are picked up by the conveyor belts 28 and 30. The bags are aligned so that the reinforced edge extends into the exposed portion 42 of the belt 28, and a guiding finger 47 is positioned adjacent the entrance end of the belt to direct the exposed edge downward into proper position for the sewing head and to prevent fouling on the tag mechanism. In addition, guide rails 50 are provided at each side of the belt runs to maintain the bags in proper alignment.

The bags are then carried along past the tag applying mechanism 44 to the sewing machine which forms a chain or purl type of stitch along the reinforced edge of the bag as it moves past. Sewing machine 46 forms a chain or purl stitch type cord which is sewn to a tag presented to the sewing machine in a manner to be described and to a bag at a spaced interval from the tag to form the desired length of cord handle. This operation once started, is continuous, forming the cord and attaching it to the tags and bags as they pass successively past the sewing head.

The joined bags and tags continue along the conveyor belts until the bag has just passed the trimmer or cutting mechanism 48 which then is actuated to sever the bag from the following tag. The bag is then carried on by the lower conveyor belt to a packing table or other suitable disposal point. Once the operation is initiated the cycle is repeated continuously with the sewing machine forming a purl stitch type cord to join together bags and tags at appropriately spaced intervals such that when they are severed by the trimmer mechanism 48 each bag has a tag joined thereto by said cord at an appropriate distance therefrom to provide a handle and suspending string therefor.

If desired, this procedure may be utilized to join two separate bags together along a reinforced edge while simultaneously attaching a tag as described, resulting in a two-compartment bag that may be easily suspended in the brewing medium.

As best seen in Fig. 6, tag applying mechanism 44 comprises a tag hopper or supply chamber 52 extending downwardly from the top of the table and a pivotally mounted suction arm 54 for removing tags therefrom and feeding them to the operating zone. Hopper 52 comprises a generally rectangular chamber having a cross-section slightly larger than the cross-sectional area of the tags 63 to be applied and carries in the bottom thereof a plate 53 and a flat spring 55 which are adapted to urge the tag upward into contact with the fingers 57 from whence they can be picked up by the suction arm 54. Fingers 57 carry thereon rollers 57' to reduce the friction encountered in removing the tags.

Arm 54 is adapted for reciprocatory motion, under the control of cam 60 as described herein, to and from the tag hopper 52 and the position shown in dotted lines in Figure 3 and carries on its free end a suction cup 56 for picking up the tags 63. In the dotted line position of Figure 3 suction cup 56 overlies the exposed portion of conveyor belt 28 and is closely adjacent the sewing head so that each tag held thereby may be picked up by the sewing machine and fastened to the preceding cord. As the arm 54 swings toward the hopper to pick up another bag, it encounters a sloped surface of a cam member 87 (see Fig. 6) which forces arm 54 downwardly to ensure that suction cup 56 will pick up a tag from the hopper 52. Arm 54 is hollow and mounted on hollow shaft 66 which is pivotally mounted in table 22. Suitable suction is applied through tube 59 from vacuum line 58. As best seen in Figure 5 the vacuum line 58 is connected to a vacuum pump 134 which is driven by a belt 136 from an electric motor 138.

As shown in Figures 1 and 5 the movement of tag arm 54 is controlled by the cam 60, fixed on shaft 65. Shaft 65 is journalled on bracket 75 mounted on shelf 26 and carries on its other end bevel gear 67. Hollow shaft 66 carries on its lower end arm 64 which has at its end cam follower roller 62. Roller 62 is urged into contact with cam 60 by spring 61 and cam 60 is driven from shaft 68 through bevel gears 67 and 69. Shaft 68 is journalled in pillow blocks 70 mounted on shelf 26 and is driven from the main drive by chain 71 through sprocket 73.

The application of the suction to the suction cup 56 is controlled through two valves 72 and 74 positioned in the vacuum line 58. Valve 72 is controlled by a lever 76 which is pivotally mounted on bracket 77 fixed on the shelf 26. Lever 76 is connected at one end to valve actuating lever 78 and has at the other end a cam follower roll 79 riding on cam 80 which in turn is adjustably mounted to shaft 68, see Figure 5, so that the operation of the valve 72 to establish and break the suction to the cup 56 may be synchronized with the pivotal action of the arm 54.

Overriding valve 72 is the main shut-off valve 74 which is controlled from the main on-off lever 81, Figure 3. Lever 81 is pivotally mounted on bracket 84 fixed on the shelf 26 and extends upwardly through slot 82 in the table top and carries on the end a knob 83. The bottom end of lever 81 is connected through link 86 to cam 88 which engages roller 90 on actuating lever 85 of valve 74 to open the vacuum line when the cam is rotated to bring raised portion 89 into contact with roller 90. Also connected to cam 88 by means of a projection 88a (see Fig. 5) carried thereby is clutch lever 108 which is positioned to engage clutch 106 on the sewing machine simultaneously with the application of the vacuum.

Positioned to the left (Figure 1) of the tag applying assembly 44 is the sewing mechanism 46 which may be of any of the conventional types employing three threads fed from spools 94, 96 and 98, to form the cable or purl stitch type of cord either about itself or about an edge of a tea bag or tag. The sewing machine head 100 is driven by belt 102 from motor 104 under the control of clutch 106 as described above. Mounted directly below the sewing head 100 is a vacuum chamber 103 which is connected by tube 105 to an exhaust pump or commercial type vacuum cleaner 107. This chamber serves to pick up and remove from the operating zone the little pieces of paper or other material punched out of bags and tags by the needle as it sews the thread about them. This prevents an undesired accumulation of dust-like particles.

Positioned still further to the left in Figure 1 is the trimmer or cut-off mechanism 48 which as may be seen best in Figure 7, comprises a pair of blades 110 and 112 mounted on bracket 114 on the table top so as to engage the cord extending between the bag and tag as it passes along the conveyor belt. Blade 112 is fixed in the table top and acts as a shear blade or block for blade 110 which is pivoted at approximately its midpoint on bracket 114. Spring 115 is provided on the pivotal axis to urge blade 110 into good cutting contact with blade 112. Guide 117 is mounted adjacent belt 28 to guide the edge of the bags and tags between the cutting blades and thus prevent fouling on the cutting mechanism.

Trimmer 48 is driven from the main drive through shaft 68, bevel gears 109 and 111, and shaft 116 which is mounted in pillow blocks 113 on shelf 26. Shaft 116 carries thereon a cam 118. Extending downwardly from the end of the blade 110 opposite the shearing portion is an arm 120 which engages a second arm 122 pivotally mounted on a bracket 124, which in turn is mounted on shelf 26, see Figure 5, and which carries on its other end cam follower roll 126. Roll 126 rides on the cam 118 under the pressure of spring 119 which is provided between roll 126 and pivot point 125 to return the trimmer blades to the open position after a cutting operation. The blades 110 and 112 are moved into cutting relationship in accordance with the shape of cam 118 which is formed and adjusted relative to the main drive to cause the shearing of the cord between the bag and the following tag as it passes through the operating zone.

As may be seen in Figure 2, the tag 128 is spaced a considerable distance from its corresponding bag 130 along the cord 132 but closely adjacent the preceding bag 130'. Trimmer 48 is adjusted to cut the cord 132 between bag 130' and the following tag 128 leaving small ends 132' of cord 132 extending from both the tag 128 and the bottom of the bags.

In actual use, the operation of this machine is advantageously synchronized with that of a bag forming machine somewhat as follows. To start the operation the electric starting switch for the associated bag forming machine is connected so that in addition to turning on the main drive of the bag forming machine, it starts the sewing machine motor 104 and the vacuum pump motor 138. Since the cam drives and the conveyor belt for the tagger and sewer mechanisms of the present invention are advantageously directly connected to a driving shaft of the bag forming machine, they start simultaneously with main drive of the bag forming machine. Thus the conveyor belt, the vacuum pump and the sewing machine motor run continuously once the machine is started. The "on-off" lever 81 which controls the application of the vacuum and the sewing as described above may then be actuated as desired to feed tags and sew the bags fed along the conveyor belts.

There is thus provided a machine for automatically applying a tag and string to large size tea bags so they may be easily and conveniently suspended in a hot brewing medium without rupturing the bag.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt and apply it in numerous forms, each as may be best suited to the requirement of a particular use.

I claim:

1. A machine for automatically attaching a tag and string to tea bags and the like which comprises a frame member, a first conveyor belt disposed along the surface of said frame member; a second conveyor belt narrower than said first belt, disposed above said belt to form a bag carrying channel therebetween and an exposed operating path therealong; a plurality of resiliently suspended rollers engaging and urging said upper belt into contact with the tea bags carried between the belts to spread out evenly the tea therein; guide channels disposed on either side of said belt to guide bags therebetween in such manner that one edge thereof is exposed along said operating path; a sewing machine disposed along said operating path to engage the exposed edge of the bags as they are carried therealong; a tag feeding assembly disposed ahead of said sewing machine, in the direction of movement of said conveyor belts, comprising a tag hopper, a pivotally mounted suction arm having a suction cup on the free end thereof mounted for movement between said tag hopper and said lower conveyor belt and toward said sewing machine, and means for applying suction to said arm and cup to transport a tag from said tag hopper to the exposed portion of the lower belt whereby the tag is brought into engagement with said sewing machine; a trimmer mechanism disposed beyond said sewing machine, in the direction of travel along said belt, comprising a first blade fixed in said frame and a second blade pivotally mounted in shearing relationship therewith, said blades being positioned to sever the thread connecting said bags and tags at appropriate intervals; and driving means for said sewing machine and said tag feeding mechanism and said trimmer mechanism and said conveyor belts including synchronizing cam means for correlating the operation of said machine and mechanisms.

2. A machine for attaching tags and cords to tea bags and the like comprising a sewing machine for forming a continuous cord, a common conveyor for transporting both tea bags and tags delivered thereto to the sewing machine for the application of the cord thereto, the tea bags being delivered at spaced intervals to the conveyor, a hopper for storing tags, a reciprocating arm for delivering tags from the hopper to the conveyor ahead of the stitching machine, whereby the cord is applied to the tag, suction means carried by the reciprocating arm to hold a tag, vacuum means, a conduit between the vacuum means and the suction means carried by the arm, a valve for controlling the application of suction through the conduit to the suction means carried by the arm, a drive transmission for reciprocating said arm, means associated with said drive transmission for operating said valve to make and break the suction to said suction means carried by the arm in timed relation to the reciprocating movement of the arm, a master valve in series with said valve, manually engageable means for controlling the operation of said master valve, drive means for the sewing machine, and means controlled by said manually engageable means for establishing a driving connection to the sewing machine.

3. A machine for automatically attaching a tag and a string to a bag comprising a pair of conveyor belts which travel one above the other along an operative stretch, the lower belt having an exposed strip beyond one edge of the upper conveyor belt, means for introducing the bags between the upper and lower belts one at a time, such that at least a portion of the bag overlies the exposed strip of the lower conveyor belt, a storage hopper for a plurality of tags, means for feeding the tags onto the exposed strip of the lower conveyor belt between successive bags, and a sewing machine for attaching a string to the bag and to the tag as the conveyor belts present the bags and the tags to the sewing machine.

4. A machine as set forth in claim 3 including guide means disposed adjacent at least a portion of the operative stretch of the conveyor belts to insure registration of one edge of the bags.

5. A machine as set forth in claim 3 including means operating at predetermined intervals to sever the string.

6. A machine for automatically attaching a tag and a string to a pre-filled tea bag comprising a pair of conveyor belts which travel one above the other along an operative stretch, the upper conveyor belt being narrower in width than the lower conveyor belt, leaving an exposed strip of the lower conveyor belt beyond one edge of the upper conveyor belt, means for delivering pre-filled tea bags onto the receiving end of the lower conveyor belt at spaced-apart intervals, a guide adjacent the conveyor belts for registering at least one edge of the tea bags, the tea bags being received between the conveyor belts in such fashion that a portion of the tea bag overlies the exposed strip of the lower conveyor belt when the bag is properly registered, a plurality of rollers engaging the upper side of the upper conveyor belt, maintaining the upper conveyor belt in pressure contact with the tea bag to flatten the tea bag and evenly distribute the contents therein, a storage hopper for a plurality of tags, means for removing a tag from the hopper and delivering it onto the exposed strip of the lower conveyor intermediate the tea bags transported by the conveyor belts, means for receiving a spool of string, means for paying out the string, and means stationed adjacent said conveyor belts to sew the string along an edge of the tea bag and an edge of the tag.

References Cited in the file of this patent

UNITED STATES PATENTS

| | | |
|---|---|---|
| 583,376 | Hoppe | May 25, 1897 |
| 1,026,833 | Scott et al | May 21, 1912 |
| 1,688,268 | Dalton | Oct. 16, 1928 |
| 1,780,005 | Crawford | Oct. 28, 1930 |
| 2,071,244 | Williams | Feb. 16, 1937 |
| 2,082,738 | Vesconte | June 1, 1937 |
| 2,135,806 | Fermann et al. | Nov. 8, 1938 |
| 2,164,501 | Cundall et al. | July 4, 1939 |
| 2,313,433 | Golden | Mar. 9, 1943 |
| 2,327,252 | Dickerson | Aug. 17, 1943 |
| 2,578,314 | Muench | Dec. 11, 1951 |
| 2,630,085 | Dusin et al. | Mar. 3, 1953 |